Aug. 15, 1967 T. R. KELLEY 3,336,516
CONTROL CIRCUIT FOR D-C MOTORS HAVING DUAL SERIES FIELD WINDINGS
Filed Feb. 15, 1965 5 Sheets-Sheet 1

INVENTOR.
THOMAS R. KELLEY
By
OSTROLENK, FABER,
GERB & SOFFEN
ATTORNEYS

FIG. 2a.
180° CONDUCTION
$i_{10}$ (SOURCE 12)
$i_2$ (SOURCE 13)
$i_3$ ARMATURE
$i_4$
$i_5$
$i_6$
$i_7$
$i_8$
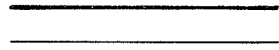
$i_9$
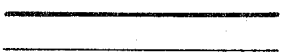
$i_{10}$
$i_{11}$
FIG. 2b.
360° CONDUCTION
INVENTOR.
THOMAS R. KELLEY
BY
OSTROLENK, FABER, GERB & SOFFE
ATTORNEYS

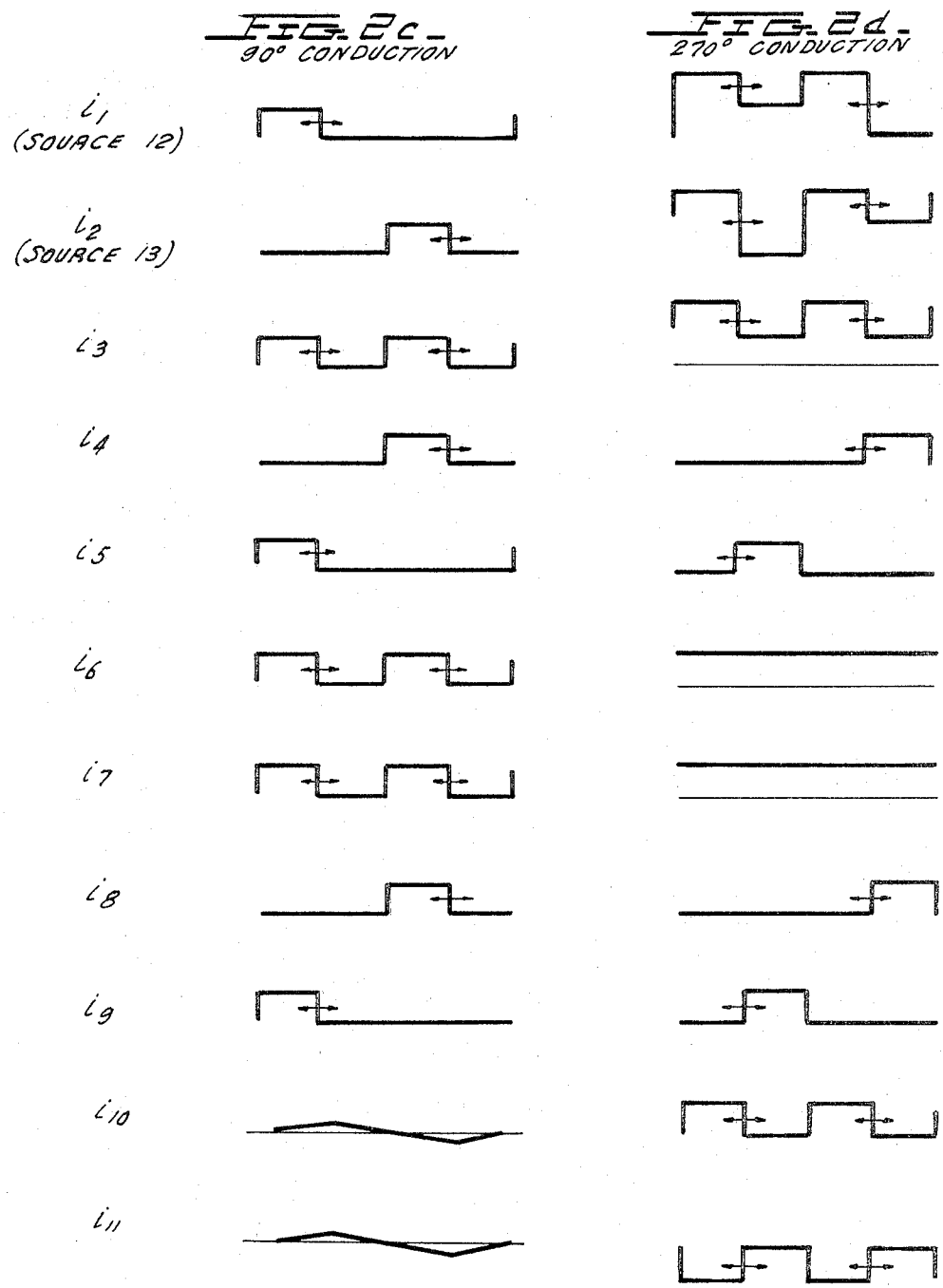

INVENTOR.
THOMAS R. KELLEY
BY
OSTROLENK, FABER, GERB & SOFFEN
ATTORNEYS

1/4 THROTTLE, PEAK LIMITING

FULL THROTTLE, PEAK LIMITING

3/8 THROTTLE, NO LIMITING

United States Patent Office 3,336,516
Patented Aug. 15, 1967

3,336,516
CONTROL CIRCUIT FOR D-C MOTORS HAVING DUAL SERIES FIELD WINDINGS
Thomas R. Kelley, Audubon, N.J., assignor to I-T-E Circuit Breaker Company, Philadelphia, Pa., a corporation of Pennsylvania
Filed Feb. 15, 1965, Ser. No. 432,684
6 Claims. (Cl. 318—139)

This invention relates to a novel control circuit for D-C motors used, for example, in traction vehicles, and more particularly relates to a novel control circuit which permits stepless transition in the effective switching of dual field windings of a D-C motor from initial series operation to parallel operation as the motor comes up to speed.

In accordance with the present invention, this type of circuit arrangement is connected to an auxiliary field winding circuit whereby two input D-C sources are switched in a stepless manner from their series connection to their parallel connection in relation to the two field windings, thus effectively switching the field windings from series to parallel relation with respect to one another in a stepless manner.

An infinitely variable control is highly desirable for traction motors in battery powered vehicles. Such vehicles commonly utilize a two-battery source, and have motors with two series fields and a switching arrangement which enables starting of the vehicles with the batteries in parallel with one another and the fields in series. By placing the batteries in parallel, the output voltage to the motor is reduced, while placing the fields in series provides maximum resistance and the strongest field as required for starting conditions. A control circuit then provides a plurality of discrete control steps, whereby the batteries are switched to series operation as the motor comes up to speed, while the fields are connected in parallel with one another to reduce resistance and effectively weaken the field.

While this type arrangement is quite efficient for the operation of the vehicle, the switching steps required prevent smooth control.

The principle of the present invention provides a novel circuit arrangement for permitting the switching of the field windings from series to parallel connection, and the switching of the battery sources from an effective parallel to a series connection in a smooth, easily controlled manner.

Accordingly, a primary object of this invention is to provide a novel control circuit which provides a smooth transition from starting to running conditions for D-C battery operated vehicles.

Another object of this invention is to provide a novel control circuit for permitting a smooth transition between the series to parallel connection of the two field windings of the D-C motor.

A further object of this invention is to improve the smoothness of operation of D-C motor operated vehicles having dual field winding motors.

These and other objects of this invention will become apparent from the following description when taken in connection with the drawings, in which:

FIGURE 2a illustrates a series of curves showing various currents as a function of time within the circuit of FIGURE 1 for 180° conduction of each of the choppers of FIGURE 1.

FIGURE 2b is similar to FIGURE 2a showing the same currents as in FIGURE 2a on adjacent graphs for 360° conduction.

FIGURE 2c is similar to FIGURES 3a and 3b for the case of a 90° length of conduction FIGURE 2d is similar to FIGURES 2a, 2b and 2c for the case of a 270° length of conduction for the choppers.

Figure 1:
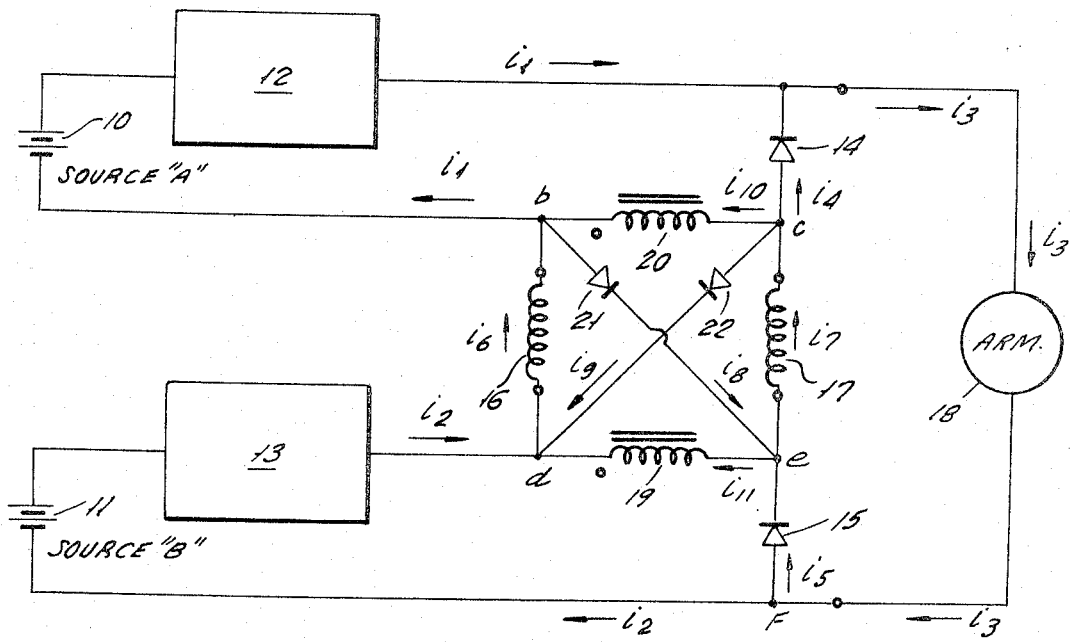
FIGURE 1 is a schematic diagram of the novel circuit of the present invention.

Referring now to FIGURE 1, I have illustrated therein a schematic diagram illustrating the basic concept of the invention. In particular, the circuit of FIGURE 1 enables two battery sources 10 and 11 which could, for example, be 36 volt-sources to operate effectively in parallel with a smooth transition to their operation in series. Thus, two chopper circuits 12 and 13 are connected in series with sources 10 and 11, respectively, and in series with rectifiers 14 and 15, respectively. The rectifiers 14 and 15 are then connected in series with one another and with the two field windings 16 and 17 and the armature winding 18 of a dual field winding D-C motor commonly used in traction applications.

Two reactor windings 19 and 20, which are wound on a common magnetic core and which have their starts illustrated by the conventional dot in FIGURE 1, are then connected between the lower and upper ends of field windings 16 and 17, while diodes 21 and 22 connect the upper end of winding 16 to the lower end of winding 17, and the upper end of winding 17 to the lower end of winding 16, respectively.

The novel circuit of the invention, as will be seen more fully hereinafter, permits a smooth transition from starting operation to full speed operation with the battery sources 11 and 12 being effectively switched from parallel to series connection, while the field windings 16 and 17 are effectively switched from series to parallel connection in a smooth, stepless manner.

In general, and since two choppers 12 and 13 are used, the choppers are synchronized to turn on sequentially with their conduction angles (duty cycle) being varied from 0° to 360°. The chopper 12, for example, will be turned on at 0°, while the chopper 13 is also turned on at 180°. So long as the conduction angle of the choppers 12 and 13 is less than 180°, there will be no overlap conduction and only one of sources 10 and 11 supplies power at any time.

Assuming first that the chopper 12 is conducting and chopper 13 is off, it will be seen that current will flow from the positive terminal of source 10 through chopper 12 through armature 18 to rectifier 15, field winding 17, diode 22, field winding 16, and back to the negative terminal of source 10. Note that current will also tend to flow into the finish, and out of the start of windings 20 and 19. However, because of the chopping frequency and the mutual reactance of windings 19 and 20, this current will be negligible. Also note that when the chopper 12 turns off, and prior to conduction of chopper 13, the diodes 21 and 22 provide "free wheeling" paths to dissipate inductive currents.

When chopper 12 is turned off and chopper 13 is turned on, current will flow from the positive terminal of source 11 through chopper 13, field winding 16, diode 21, field winding 17, rectifier 14, motor armature 18 and back to the negative terminal of source 11. Once again because of the chopping frequency and mutual reactance of windings 19 and 20, current flowing into the start and out of the finish of windings 20 and 19, respectively, will be negligible. Moreover, the diodes 21 and 22 form "free wheeling" paths to dissipate inductive currents.

Under this condition of operation, it will be seen that the voltage sources 10 and 11 are effectively in parallel with the average output voltage being lower than the output voltage of either of the sources. Moreover, current flow through the field windings 16 and 17 is in series so that the windings are effectively in series, whereby the desired starting conditions most favorable for D-C motor operation are obtained for conduction angles less than 180° for choppers 12 and 13. Moreover, there is a smooth transition of the applied voltage within this range of regulation.

Once the conduction angles of choppers 12 and 13 exceed 180°, the choppers will simultaneously conduct during the period of overlap.

Assuming now that both choppers 12 and 13 conduct during an overlapping period, current will flow from the positive terminal of source 10 through chopper 12, armature 18, and back to the negative terminal of source 11. Current will also flow from the positive terminal of source 11 through chopper 13, field winding 16, to the negative terminal of source 10.

It is to be specifically noted that because current flows into the start of winding 19 and into the finish of winding 20, the inductive reactance of windings 19 and 20 are effectively eliminated from the circuit whereby the field winding 17 is effectively connected directly in parallel with field winding 16. Thus, when current flows through field winding 16 coming from the positive terminal source 11, it will also flow into the parallel connected winding 17. Therefore, during the overlapping period of conduction, the voltage sources 10 and 11 are effectively connected in series with one another, while the field windings 16 and 17 are effectively connected in parallel with one another.

Moreover, during 360° conduction angle conditions (when both of choppers 12 and 13 are continuously on), none of rectifiers 14 and 15 or diodes 21 or 22 are in the path of major current conduction so that the only power losses will be the IR drops in the copper conductors.

To understand the operation of the circuit of FIGURE 1 in more detail, arbitrary current designations have been applied thereto, these currents being shown in FIGURES 2a, 2b, 2c and 2d for 180° conduction, 360° conduction, 90° conduction, and 270° conduction, respectively.

FIGURES 2a through 2d are self-explanatory, it being noted that in FIGURES 2c and 2d the double-ended arrows indicate those portions of the waveform which is controlled through the suitable control of the conduction period of choppers 12 and 13.

With regard to FIGURE 2a, it should be particularly noted that the currents through reactor windings 19 and 20 shown at the bottom of the figure will rise and fall at a rate sufficient only to produce counter EMF equal to the voltage applied across the windings, which is approximately equal to the voltages across field windings 16 and 17. The inductive value chosen for windings 19 and 20 is selected such that these currents $i_{10}$ and $i_{11}$ do not rise to significant values at the chopping frequency employed.

In the transition from FIGURE 2a to 2b or 180° conduction, it is seen that all sources conduct continuously so that all currents are continuous with no undulation. Moreover, the currents $i_4$, $i_5$, $i_8$ and $i_9$ through rectifiers 14, 15 and diodes 21 and 22, respectively, are all zero. Moreover, FIGURE 2b specifically illustrates that the field currents $i_6$ and $i_7$ are only one-half of the armature current $i_3$ and of the source currents $i_1$ and $i_2$.

In FIGURE 2d where the waveforms are drawn for 270° conduction, it should be noted that the source and armature currents $i_1$, $i_2$ and $i_3$ rise to a maximum during the period of overlap in which choppers 12 and 13 conduct simultaneously. Moreover, the armature current $i_3$ falls to a minimum of one-half peak value during the intervals between overlap. This characteristic improves the form factor (the ratio of the average value of $i_3$ to the RMS value of $i_3$) to minimize armature heating.

Figure 3:
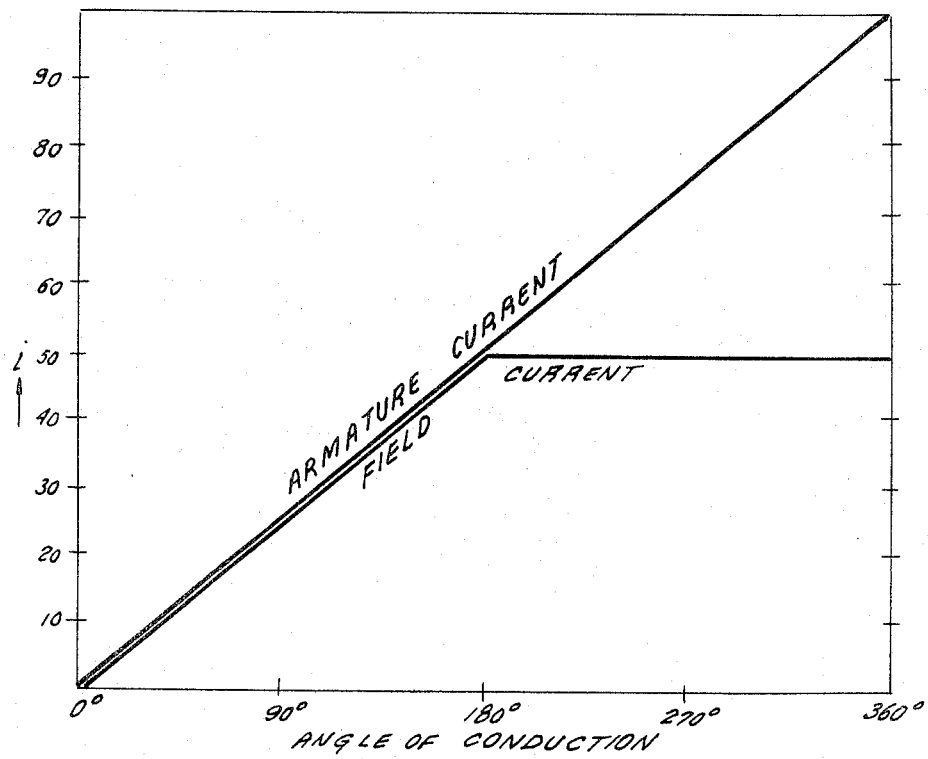
FIGURE 3 illustrates relative armature current and field current as a function of the angle of conduction or length of conduction of the choppers of FIGURE 1.

The variation of the average armature current $i_3$ and the average field currents $i_6$ and $i_7$ for various conduction angles are more particularly illustrated in FIGURE 3. In FIGURE 3 it will be seen that these currents are directly proportional to the duty cycle, or length of conduction, from conduction angles from 0° to 180°. For conduction greater than 180°, the armature current is directly proportional to the duty cycle, but the average field currents remain constant.

Figure 4:
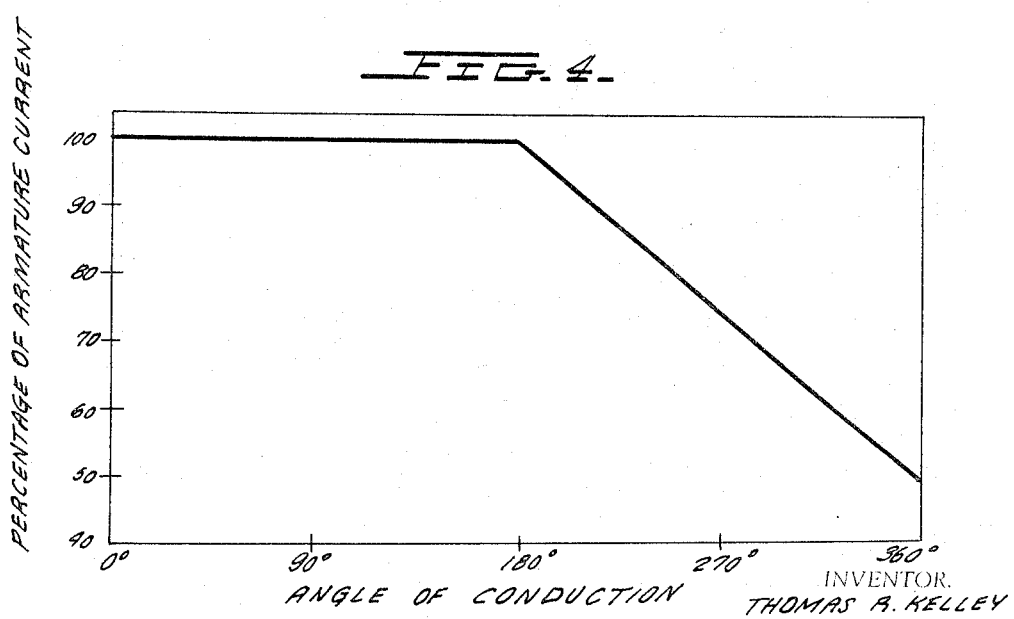
FIGURE 4 shows the field current of each field in percentage of the armature current for different conduction angles of the chopper.

FIGURE 4 particularly illustrates the field current relative to armature current as a function of conduction angle.

The inductive effects of the motor fields and armature have been neglected in the waveforms shown in FIGURES 2a and 2b, 2c and 2d. As a practical matter, however, these inductive effects cause some variation in the actual waveform measured. However, all induced voltages are dissipated through the various rectifiers and diodes which act as "free wheeling" diodes so that the overall performance of the system is enhanced by the resulting improvements in form factors of the field and armature currents. The finite current rise times resulting from inductive reactances can be used advantageously in arrangements to limit the peak currents.

Thus, under stalled or heavily loaded conditions, the motor counter EMF is so low that excessive currents might result even from the potential of a single source battery. Because the inductive reactances of the motor fields and armature cause a finite rise time for the current, suitable detectors (not shown) can be used to automatically turn off each chopper when its current rises to a predetermined level. To maintain the highest possible motor torque for starting, the opposite chopper can be switched ON at the same time that either chopper is turned OFF by the current detector, resulting in a sawtooth-waveform current having an average value of approximately one-half the peak value.

Figure 5A:
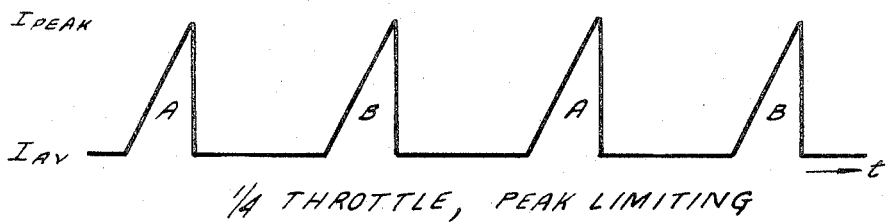
FIGURES 5a, 5b and 5c show peak current limited waveforms in accordance with the invention.
Figure 5B:
Figure 5C:
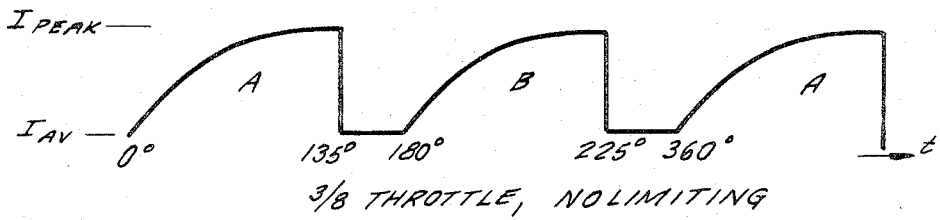

Thus, as shown in FIGURES 5a and 5b, the current is peak limited for a suitable maximum instantaneous current $I_{peak}$ shown for conditions of ¼ cycle conduction (¼ throttle) and full cycle conduction (full throttle), respectively. FIGURE 5c shows ⅜ cycle conduction in the absence of peak current limiting. Note that the alternate pulses in FIGURES 5a, 5b and 5c refer to alternate conduction of the two choppers of FIGURE 1. Thus, with peak limiting means, the chopper frequency decreases as the motor speed increases, to the point where normal throttle control takes over.

In some cases, the inductive reactances inherent in the motor may not be sufficient to hold the current rise ($di/dt$) to a value which enable practical detection and switching.

Figure 6:
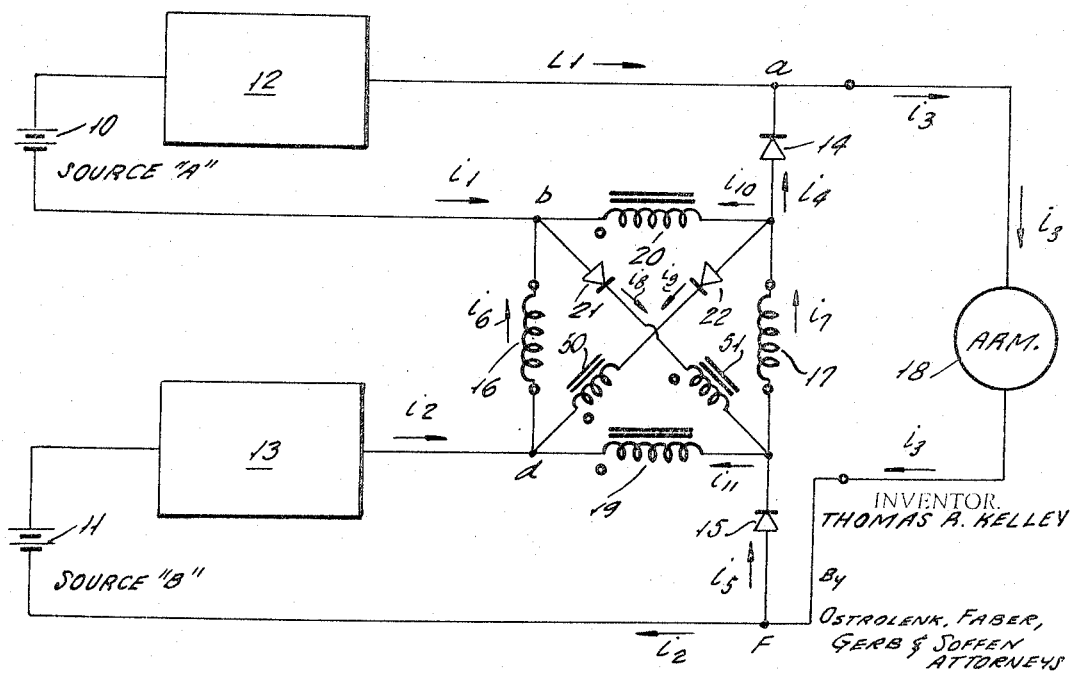
FIGURE 6 is a modified circuit diagram similar to FIGURE 1.

In accordance with the invention, and as shown in FIGURE 6, additional inductances 50 and 51 can be added in series with diodes 22 and 21, respectively. Note that these two inductors 50 and 51 are on a common core. The current $i_9$ through inductor 50 magnetizes the core with a polarity opposite to the magnetization resulting from current $i_8$ through inductor 51. This prevents saturation of the core inductor 50 and enables the necessary reactances to be obtained from a small reactor.

Moreover, with or without the use of intentional inductances 50 and 51, the armature 18 can be short circuited and windings 16 and 17 replaced by two separate and independent resistive or reactive loads. The inductances 50 and 51 in this case would limit rise time of the currents from the various choppers, and thus enable limiting of the peak current through the chopper devices.

Although the invention has been described with respect to its preferred embodiments, it should be understood that many variations and modifications will now be obvious to those skilled in the art, and it is preferred, therefore, The embodiments of the invention in which an exclusive privilege or property is claimed are defined as follows:

1. An adjustable D-C voltage source for a D-C motor having an armature winding and a first and second field winding; said adjustable D-C voltage source including a first and second D-C voltage source, a first and second voltage chopper, a first and second rectifier, and a first and second reactor winding; said first and second voltage sources being connected in closed series relation with said first and second voltage choppers, respectively, said first and second rectifiers, respectively, and said first and second reactor windings, respectively; the polarity of said first and second rectifiers opposing current flow from their respective first and second D-C voltage sources in their said respective closed series circuit; said first and second rectifiers being connected in closed series relation with one another and with said armature winding with a polarity to permit unidirectional current flow in said armature winding; said first and second field windings having respective first and second terminals; said first and second reactors having first and second terminals; said first and second terminals of said first field winding being respectively connected to said first terminals of said first and second reactor windings; said first and second terminals of said second field winding being respectively connected to said second terminals of said first and second reactor windings; each of said choppers being synchronously conductive for an adjustably predetermined period of time.

2. The device of claim 1 which includes a common magnetic core for said first and second reactor windings; each of said first terminals representing the start of each of said first and second reactor windings.

3. The device of claim 1 which further includes a third and fourth rectifier; said third rectifier being connected between said first terminal of said first reactor winding and said second terminal of said second reactor winding; said fourth rectifier being connected between said first terminal of said second reactor winding and said second terminal of said first reactor winding.

4. The device of claim 1 wherein said first and second D-C voltage sources are batteries.

5. The device of claim 2 which further includes a third and fourth rectifier; said third rectifier being connected between said first terminal of said first reactor winding and said second terminal of said second reactor winding; said fourth rectifier being connected between said first terminal of said second reactor winding and said second terminal of said first reactor winding.

6. The device of claim 2 wherein said third and fourth rectifiers are connected directly in series with respective reactors.

No references cited.

BENJAMIN DOBECK, *Primary Examiner.*

ORIS L. RADER, *Examiner.*

G. SIMMONS, *Assistant Examiner.*

UNITED STATES PATENT OFFICE
CERTIFICATE OF CORRECTION

Patent No. 3,336,516                            August 15, 1967

Thomas R. Kelley

It is hereby certified that error appears in the above numbered patent requiring correction and that the said Letters Patent should read as corrected below.

Column 6, line 22, for the claim reference numeral "2" read -- 5 --.

Signed and sealed this 3rd day of December 1968.

(SEAL)
Attest:

Edward M. Fletcher, Jr.                         EDWARD J. BRENNER
Attesting Officer                               Commissioner of Patents